United States Patent [19]

Rowe

[11] Patent Number: 4,621,303
[45] Date of Patent: Nov. 4, 1986

[54] CONTROL CENTER WITH WEDGE AND JAW CONNECTOR FOR DISTRIBUTING ELECTRIC POWER

[75] Inventor: Neal E. Rowe, Asheville, N.C.

[73] Assignee: Westinghouse Electric Corp., Pittsburgh, Pa.

[21] Appl. No.: 654,626

[22] Filed: Sep. 26, 1984

[51] Int. Cl.⁴ .............................................. H02B 11/12
[52] U.S. Cl. ................................ 361/338; 200/50 AA; 200/259; 200/260; 361/342; 361/353; 361/361; 361/391
[58] Field of Search ............................... 200/248–251, 200/258–261, 237–238, 287, 50 AA; 361/334, 335, 338–339, 341–342, 353, 355, 361, 363, 376, 390–391

[56] References Cited

U.S. PATENT DOCUMENTS

| | | | |
|---|---|---|---|
| 1,890,514 | 12/1932 | Krips | 361/339 |
| 2,256,734 | 9/1941 | Cornell et al. | 200/260 |
| 2,647,247 | 7/1953 | Fulton et al. | 200/50 AA |
| 3,678,237 | 7/1972 | Rickert et al. | 200/259 |
| 4,121,067 | 10/1978 | Rexroad et al. | 200/50 AA |

Primary Examiner—A. D. Pellinen
Assistant Examiner—Gregory D. Thompson
Attorney, Agent, or Firm—L. P. Johns

[57] ABSTRACT

A control center for distributing electric power characterized by a cabinet enclosing bus bars, a drawout stab assembly comprising a dielectric housing containing a clamping jaw for each bus bar, each clamping jaw having a wedge and wedge-receiving means for clamping the jaws tightly on the bus bar, and a nut and bolt assembly for releasably clamping the wedge in place.

2 Claims, 9 Drawing Figures

CONTROL CENTER WITH WEDGE AND JAW CONNECTOR FOR DISTRIBUTING ELECTRIC POWER

BACKGROUND OF THE INVENTION

1. Field of the Invention

This invention relates to a control center and more particularly to stab terminals for drawout switch gear with clamping jaws releasably engaging bus bars.

2. Description of the Prior Art

In motor control centers, the present practice of connecting controllers and/or feeders to a vertical distribution system has been accomplished in two ways. First a drawout or stab arrangement using either a current-carrying material with spring characteristics or a current-carrying material backed up by a spring to establish the force has been limited to 400 amperes or less. Second, a bolted connection which requires a drill to be drilled or punched in both the bus and its mating part has been used for higher ampere ratings. A disadvantage inherent in the second procedure is that the rear side of the bus bar must be accessible for insertion of bolts. Inasmuch as the drawout or stab arrangement in motor control centers is limited by space and usually there is only one moving element with the bus distribution system acting as the stationary portion of the assembly, there has been a problem of combining the best features of a bolted electrical connection and accessability.

SUMMARY OF THE INVENTION

It has been found in accordance with this invention that a control center for distributing electric power from a power source to power receiving devices may be provided which comprises a cabinet having at least one stationary bus bar, a power receiving device within the cabinet, conductor means for electrically connecting the power receiving devices to bus bar and including a clamp, the clamp having jaws pivotally connected for clamped and unclamped positions of the bus bar, and the clamp also including wedge means detachably connected to the jaws for forcing the jaws to the clamped position.

The advantage of the device of this invention is that unlike spring pressure means of the prior art a larger surface interface is provided between the bus bar and the stabs which is maintained by wedges bolted in place to maintain pressure on the interface.

Another disadvantage of the spring pressure stab of the prior art was the low contact pressure or excessively high currents caused heating of the vertical bus bar and its plating which resulted in burning and ultimate replacement of the bus bar.

DESCRIPTION OF THE PREFERRED EMBODIMENT

Figure 1:
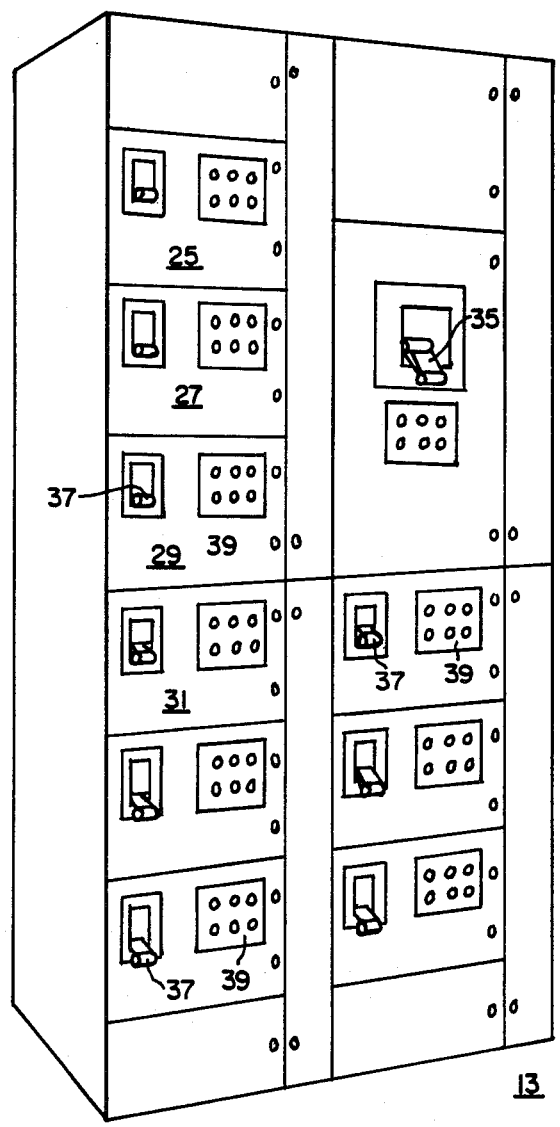
FIG. 1 is a perspective view of an electrical control center in accordance with this invention.

In the drawings, an electrical control center is generally indicated at 13. Inasmuch as the center is more specifically described in U.S. Pat. Nos. 4,024,441, 4,025,747, and 4,025,826, the description herein is limited generally to the operating parts that are pertinent to the invention.

Figure 2A:
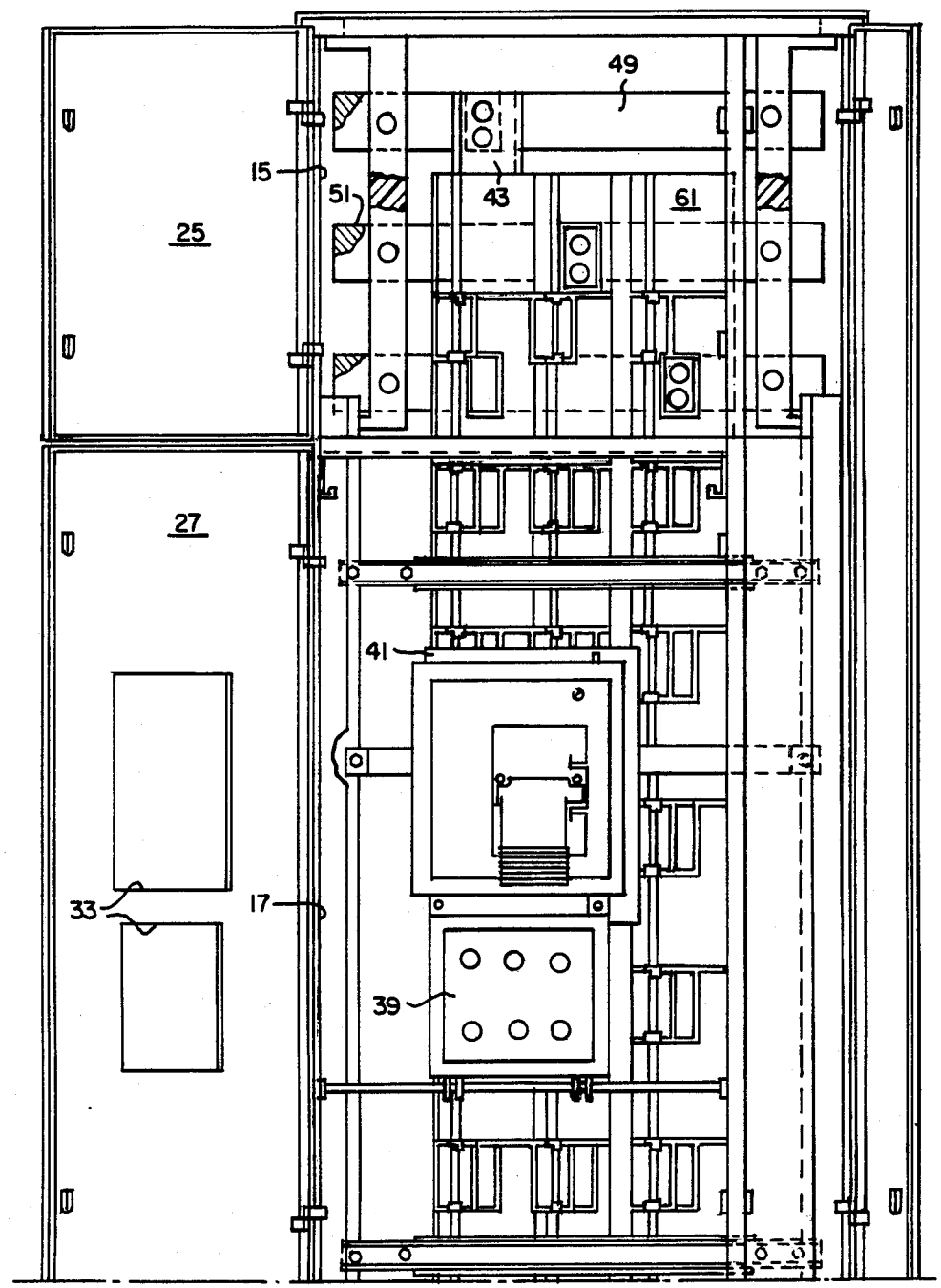
FIG. 2A is a front elevational view of the upper half of the control center with doors open.
Figure 2B:
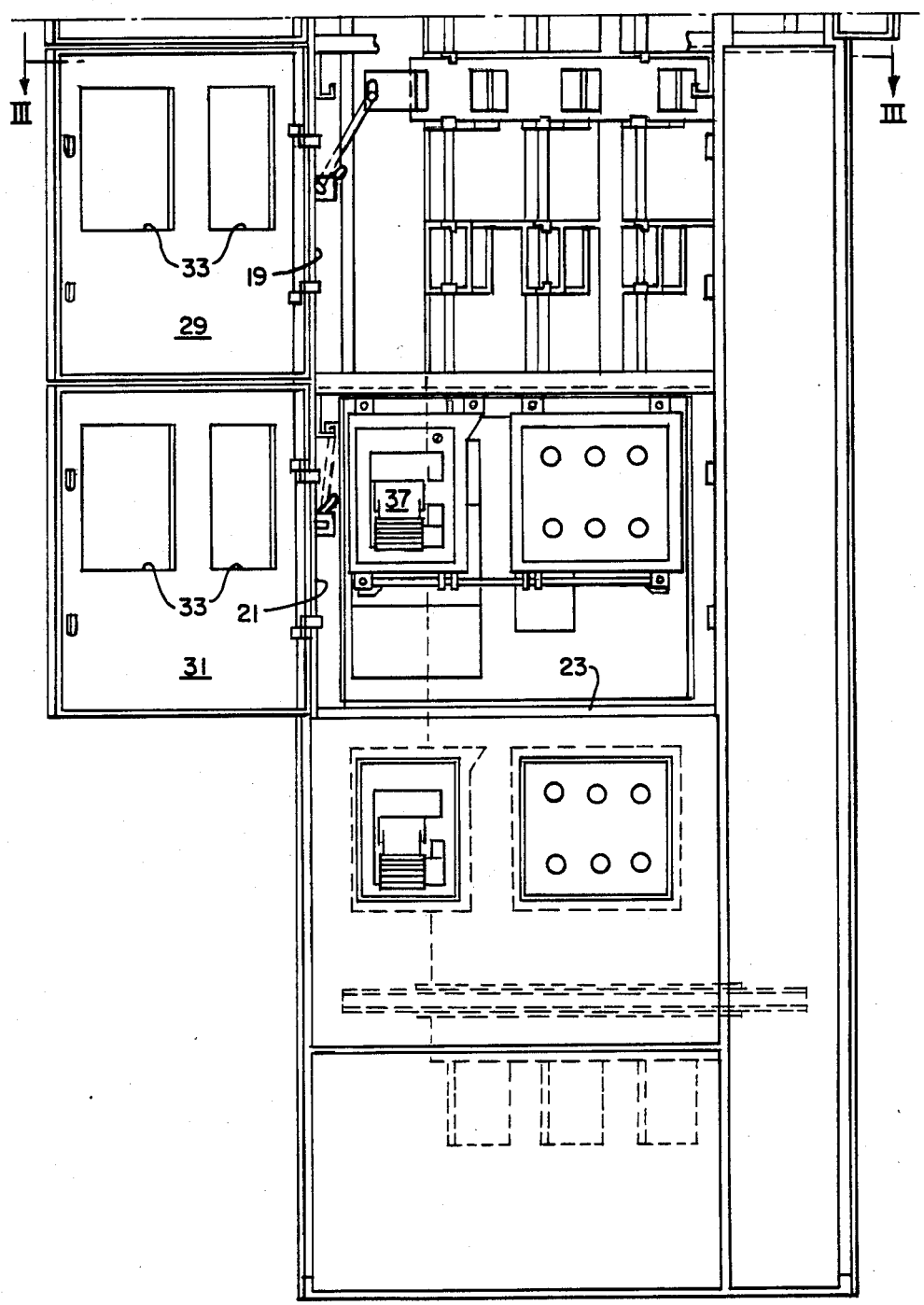
FIG. 2B is a front elevational view of the lower half of the control center with doors open.

Generally, the electric control center 13 comprises a metal cabinet having a plurality of vertically disposed compartments such as compartments 15, 17, 19, and 21 which are separated by similar horizontal shelves 23 (FIG. 2B). Each compartment has an access door 25, 27, 29, 31, respectively, which doors may be provided with appropriate openings, such as openings, 33 (FIG. 2B) to accommodate portions of circuit breakers, such as handles 35, 37, or indicator light panel 39 as required.

In the embodiment of the invention disclosed herein, the front and rear sides of the cabinet 13 include compartments similar to compartment 15-21 on the front side in which circuit interrupters 41 may be inserted from opposite sides of vertical bus bars 43, 45, 47 (FIG. 3) which are centrally disposed between front and rear sides of the cabinet 13. The upper ends of the bus bars 43, 45, 47 are respectively attached to separate horizontal bus bars 49, 51, 53.

Figure 3:
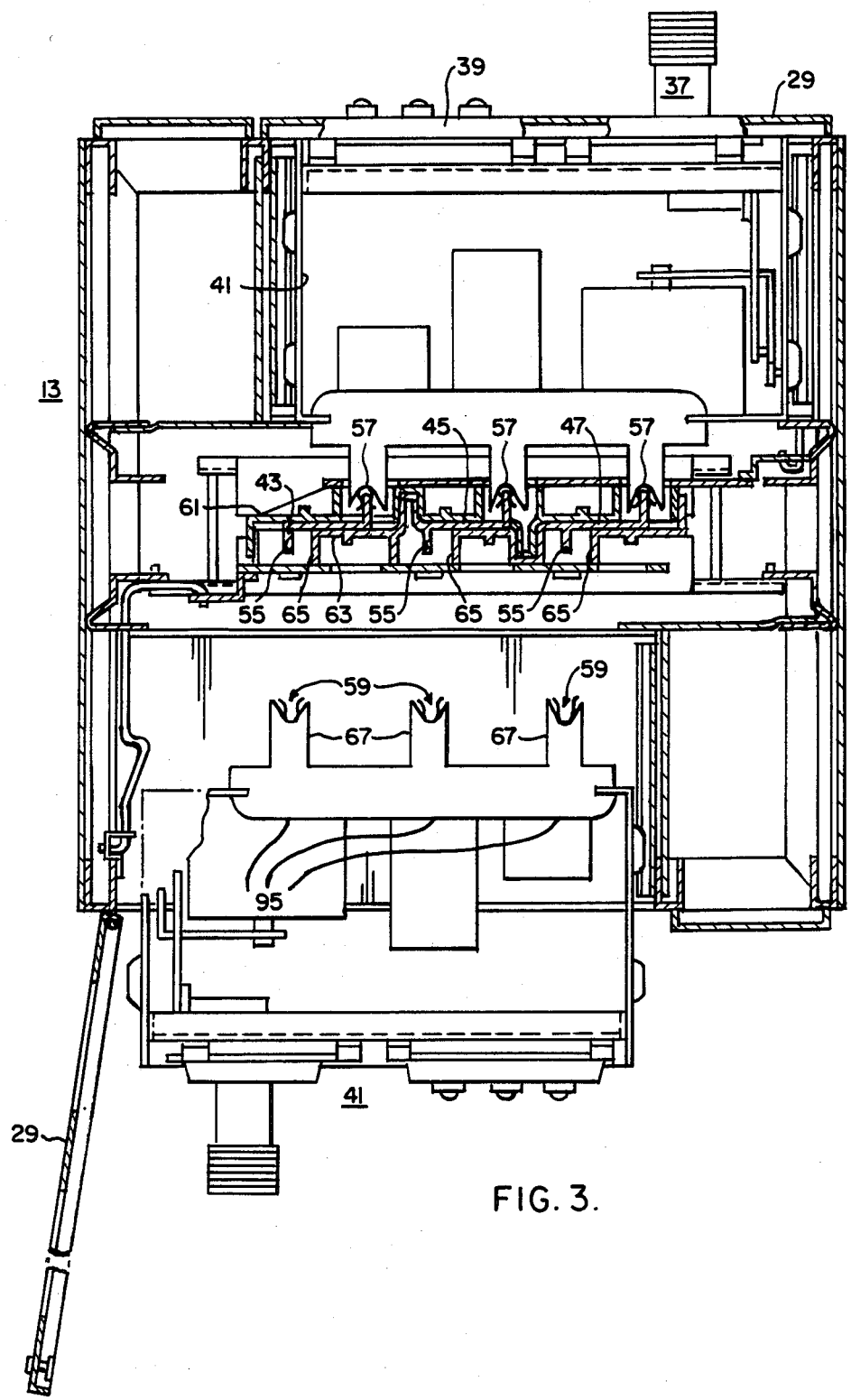
FIG. 3 is a horizontal sectional view, taken on the line III—III of FIG. 2B, with a door open and showing a circuit breaker being inserted in place.

As shown in FIG. 3, the vertical bus bars are preferably Z-shaped and consists of oppositely disposed stabs or legs 55, 57 of the bus bars 43, 45, 47 respectively. Each circuit interrupter 41 include terminal contact connectors or clamps generally indicated at 59 which are moved horizontally into and out of engagement with corresponding stabs 55.

The bus bars 43, 45, 47 are enclosed within barrier means, such as a pair of barriers 61, 63 which are substantially coextensive with the bus bars (FIG. 3). The barriers 61, 63 electrically insulate the bus bars from each other as well as increase the safety factor of the control center. To accommodate the horizontally movable or plug-in type interrupters 41 for connection to the bus bars from either front or rear sides of the cabinet, the barriers 61, 63 include horizontally spaced similar openings 65 through which connectors or clamps 59 are inserted.

Figure 4:
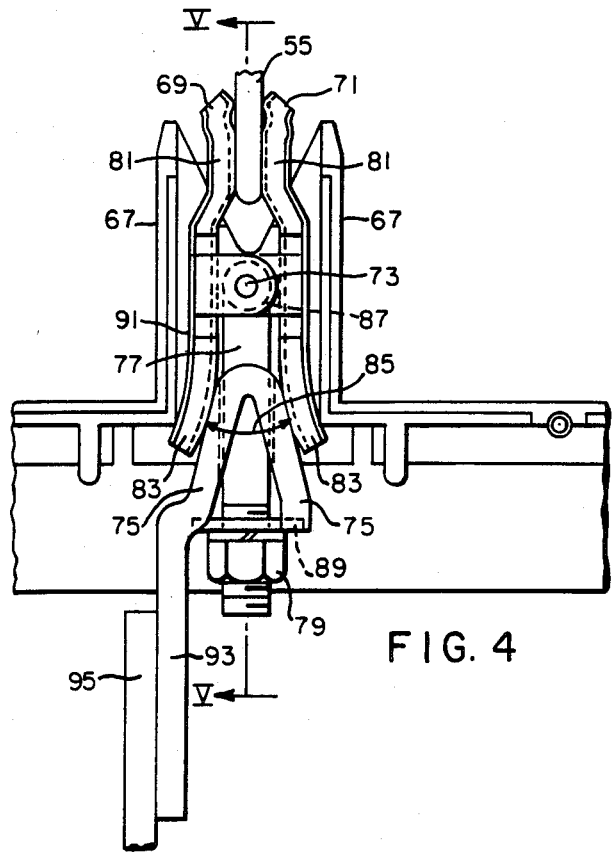
FIG. 4 is a fragmentary horizontal view showing one stab assembly for one circuit breaker and showing the manner in which the stab is returned in place in accordance with this invention.
Figure 5:
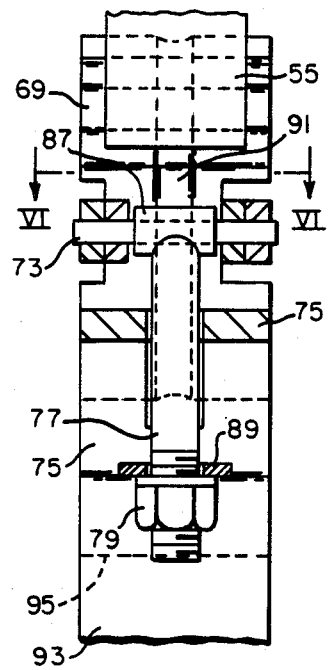
FIG. 5 is a sectional view taken on the line V—V of FIG. 4.

As shown in FIGS. 3 and 4, the connectors or clamps 59 for each phase are contained within a cover or housing 67. The assembly of the connectors or clamps 59 and the cover 67 for all phases slides into the opening 65 when the connectors or clamps 59 engage the several stabs 55.

Figure 6:
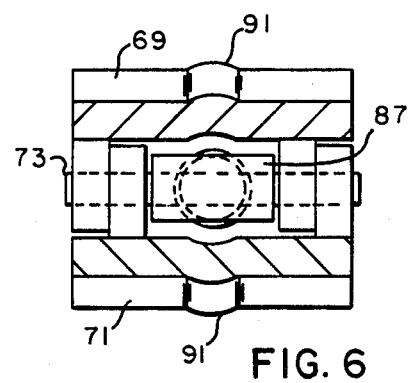
FIG. 6 is a vertical sectional view taken on the line VI—VI of FIG. 5.
Figure 8:
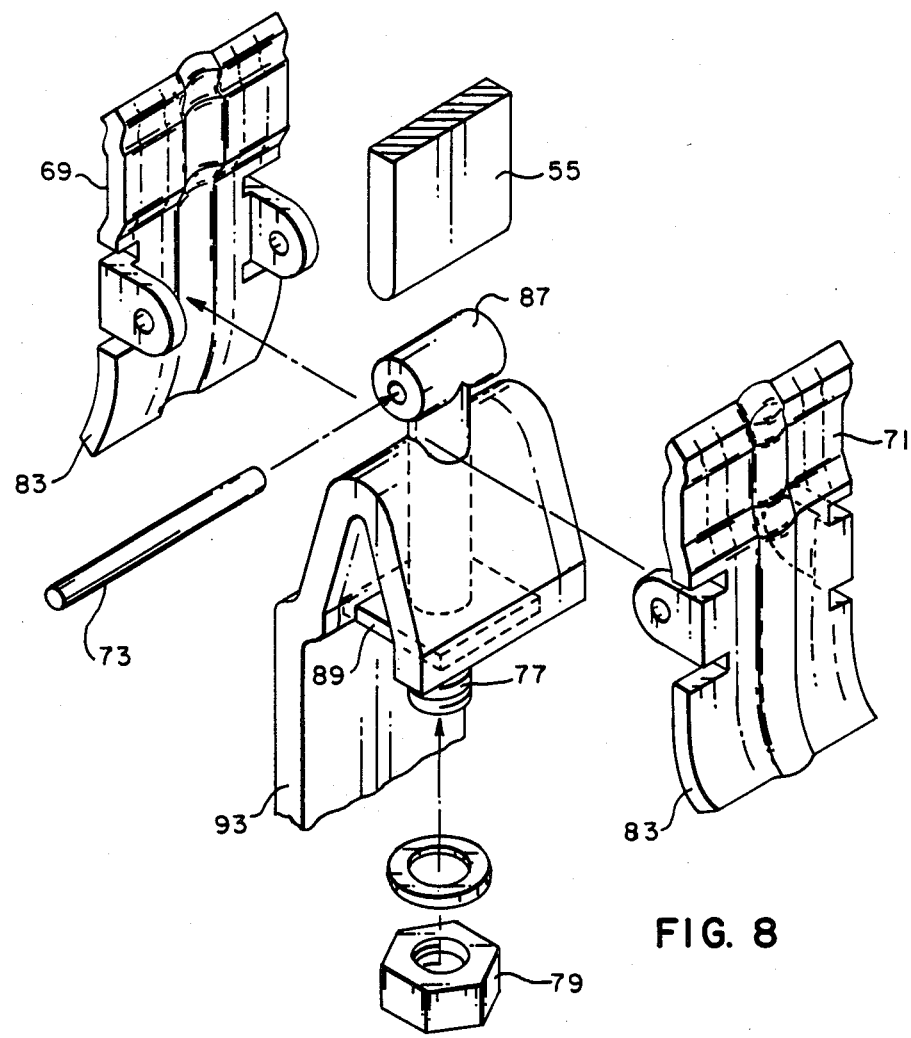
FIG. 8 is an exploded view of the jaws and wedge means.

In accordance with this invention, the connector or clamp 59 (FIG. 4) is comprised of a pair of jaws 69, 71 which are pivotally connected by pivot pin 73. Each connectors or clamps 59 also includes a wedge 75 and a draw in bolt 77 including a nut 79. The clamping jaws 69, 71 include similar oppositely facing flat portions 81, and divergent extended parts 83 on the side of the pivot pin opposite the flat portions 81. The assembly of the extended parts 83 provide a wedge-receiving zone indicated by an arrow 85. When the wedge 75 moves into the wedge-receiving zone, the divergent extended parts 83 are spread apart, causing the jaws to exert pressure on the stab 55 of the bus bar 43. To facilitate forcing of the wedge 75 into place, the nut 79 is tightened on the bolt 77 which bolt includes a hub 87 anchored to the pivot pin 73. Thus the nut acting through a washer 89 pulls the wedge into place causing the parts 83 to spread and exert increased pressure on the bus bar. Each jaw 69, 71 includes a rib 91 (FIG. 6) for strengthening the jaws and for dividing the contact area between the jaws and the stab 55 into two square areas which helps to ensure a flat area of contact. The pivotable connection at the pivot pin 73 enables the jaws to open wide to ensure certain amount of float which is required at the meeting edges of the jaws for proper contact alignment when interfacing the stab 55.

As shown in FIG. 4, one side of the wedge 75 may include an extension 93 to which a braided connector 95 is secured. The connectors 95 for each phase jaw extend to a circuit breaker 41.

Figure 7:
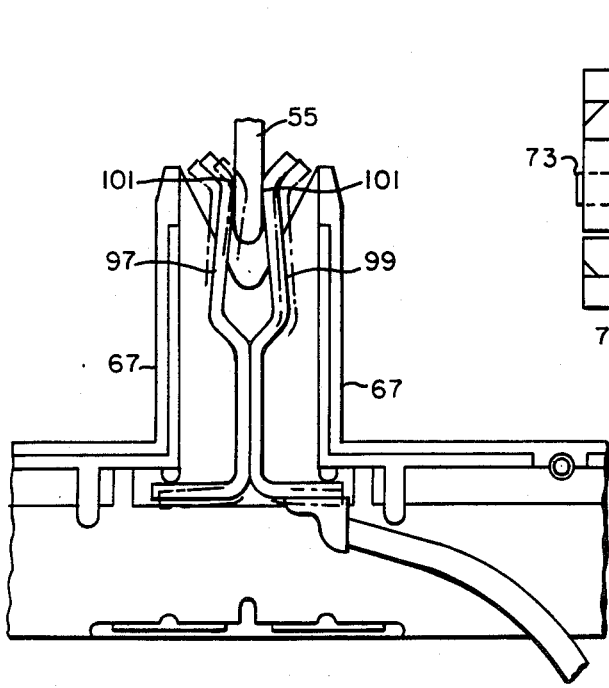
FIG. 7 is a fragmentary horizontal sectional view showing one stab assembly of prior art construction.

A comparison of the jaw construction of this invention with spring clip contacts 97, 99 of the prior art (FIG. 7) indicates the larger contact area between the jaws 69, 71 of this invention and the single line contact 101 of the prior art structure.

In conclusion, the bolted stab connection between the jaws and the bus bar has the advantage of providing a better electrical connection due to the larger surface area, the greater pressure between the stabs and contacts, and the reduced heating between the connected parts.

I claim:

1. A control center for distributing electric power from a power source to a power receiving device, comprising
    (a) a cabinet having at least one bus bar,
    (b) a power receiving device within the cabinet,
    (c) conductor means electrically connecting the power receiving device to the bus bar and the means including a clamp,
    (d) the clamp including a jaws assembly having a pair of jaws and a pivotal connection for the jaws;
    (e) the pair of jaws being movable between clamped and unclamped positions of the bus bar;
    (f) each jaw having an extended position on the side of the pivotal connection opposite the bus bar;
    (g) wedge means for clamping the jaws to the bus bar and comprising a wedge and draw-in means for the wedge including a bolt and nut assembly;
    (h) the bolt being secured to the pivotal connection and extending between the extended portions;
    (i) the nut being mounted on the bolt adjacent to the wedge so as to move the wedge between the extended portions and to thereby clamp the jaws onto the bus bar; and
    (j) the extended portions diverging apart so as to facilitate movement of the wedge.

2. The device of claim 1 in which an electrically insulative barrier encases the clamp and includes access opening means for access to the nut and bolt assembly.

* * * * *